(12) United States Patent
Golanbari et al.

(10) Patent No.: US 7,054,393 B2
(45) Date of Patent: May 30, 2006

(54) SHORT AND LONG SEQUENCE BOUNDARY DETECTION ALGORITHM FOR WIRELESS LAN MODEMS

(75) Inventors: Michael Golanbari, Santa Rosa, CA (US); Richard Williams, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 861 days.

(21) Appl. No.: 10/057,012

(22) Filed: Jan. 25, 2002

(65) Prior Publication Data
US 2003/0142766 A1 Jul. 31, 2003

(51) Int. Cl.
*H03D 1/00* (2006.01)

(52) U.S. Cl. .................................................. 375/343

(58) Field of Classification Search ................. 375/343, 375/229, 224, 225, 222; 370/355, 517
See application file for complete search history.

(56) References Cited

U.S. PATENT DOCUMENTS

| | | | | |
|---|---|---|---|---|
| 4,531,212 A | * | 7/1985 | Hadziomerovic | ........... 370/476 |
| 5,848,067 A | * | 12/1998 | Osawa et al. | .......... 370/395.61 |
| RE38,523 E | * | 6/2004 | Ozluturk | ..................... 375/367 |

* cited by examiner

*Primary Examiner*—Khai Tran
(74) *Attorney, Agent, or Firm*—Abdul Zindani; W. James Brady, III; Frederick J. Telecky, Jr.

(57) ABSTRACT

A method for detecting a boundary between two sequences in a wireless local area network is presented that permits rapid detection of the boundary. The method includes provisions for proper operation when significant interference and multi-path can degrade the received transmission significantly. Additionally, when a modification is made to the signaling format to signal a special enhanced mode with performance and features above those that are specified in a single technical standard, the method detects the boundary between sequences regardless of whether they have the standard format or the modified format.

22 Claims, 2 Drawing Sheets

SHORT AND LONG SEQUENCE BOUNDARY DETECTION ALGORITHM FOR WIRELESS LAN MODEMS

FIELD OF THE INVENTION

This invention relates generally to wireless digital communications systems, and particularly to detecting boundaries between sequences within a sample stream.

BACKGROUND OF THE INVENTION

In many modern wireless communications systems, information is organized into data units. When transmitted, the data units may be partitioned into transmission packets, with the number of packets depending on the size of the data units. The data units contain the information being transmitted along with control information. The control information includes destination information, network identifier, data rate, information length, and the like. For example, in an IEEE 802.11a wireless network, each data unit begins with a 16 micro-second field containing a short and a long sequence field, with each field being eight micro-seconds in length. The short and the long descriptors refer to the periodicity of the sequences. The 16 micro-second field contains ten periods of the short sequence and two and a half periods of the long sequence. Following the 16 micro-second field is another field containing information such as the bit-rate and the encoding of the data that is to follow.

The short sequence is used mainly to allow the wireless stations to detect the presence of a transmitted packet (which in turn, contains at least a portion of the data unit) on the shared communications medium and to adjust its receiver signal gain to bring the received signal to a level acceptable for processing purposes. The purpose of the long sequence is to allow the intended recipient of the data unit to make adjustments to its receiver hardware to maximize the probability of accurately receiving the data unit. The adjustments include configuring the receiver's adaptive channel equalizer and digital filters to current communications channel conditions.

In many communications systems, training sequences are typically transmitted concatenated together, without any indicator of when one group (sequence) ends and when another begins. Without a special indicator, finding the boundary between sequences may require a large amount of processing of the received sequence. Additionally, noise and interference in a transmitted signal can reduce the quality of the received sequence, making it more difficult to determine the boundaries.

A need has therefore arisen for an algorithm for detecting the presence of a boundary between sequences in a transmitted data stream in an environment where noise and interference can reduce the quality of the received signal.

SUMMARY OF THE INVENTION

In one aspect, the present invention provides a method for determining a boundary between sequences that are transmitted one after the other comprising the steps of sampling signal values from the communications channel and using the samples to detect the presence of a packet on the communications channel, correlating a most recently sampled signal value with a set of previously sampled signal values and then averaging the individual correlation results into a single value, with the averaged correlation value being used to determine an initial boundary detection and setting the status of several flags, using the flags and newly sampled signal values to set a value of a register and then using the register value to determine the boundary.

There are many advantages to the present invention. A preferred embodiment of the present invention allows a receiver of a communications system to rapidly detect a boundary between sequences in the digital sample stream. Rapid detection of such boundaries permits proper and timely processing of the sequences, reducing performing unnecessary and incorrect processing of sequences prior to the detection of the boundary.

Also, a preferred embodiment of the present invention allows a boundary to be detected even when the relative quality of the received signal is low by presenting several detection thresholds and criteria.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

A proposed embodiment of the present invention discloses a method for rapidly detecting the occurrence of a boundary in a sample stream between two sequences. The method uses correlation of the sample stream to detect differences between the two sequences. The differences between the two sequences are in the periodicity, encoding, etc. of the sequences. Another preferred embodiment provides for the use of a special marker using a portion at the end of the first sequence to further enhance detection of the boundary between the sequences. While the present implementation involves the use of the invention in detecting boundaries for a specific wireless communications system, namely the systems that are compliant to the IEEE 802.11a wireless local area network, the ideas presented have application in other types of networks. Therefore, the present invention should not be construed as being limited solely to the detection of boundaries in a digital data stream for an IEEE 802.11a wireless network. Examples of other networks where the present invention may have applicability includes other IEEE 802.11 wireless networks, HiperLan II networks, and proprietary networks that transmit control information in the same information stream as data information.

Figure 1:
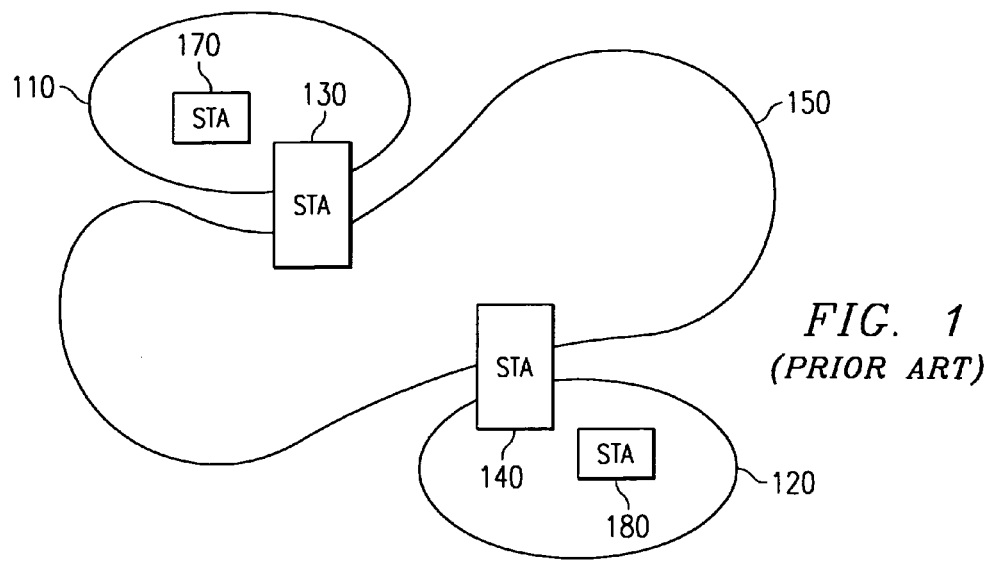
FIG. 1 displays a prior art diagram illustrating a typical configuration of a wireless communications system.

Referring now to FIG. 1, a diagram (prior art) of a typical wireless local area network (LAN) installation according to the IEEE 802.11 technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference and a supplement to the IEEE 802.11 technical standard, "IEEE Std 802.11a-1999, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band," which is also incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

Figure 2:
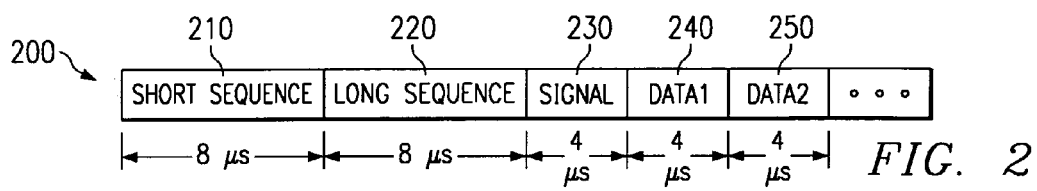
FIG. 2 displays a diagram illustrating a typical frame structure of an IEEE 802.11a wireless network communications data unit.

Referring now to FIG. 2, a diagram illustrates the structure of a physical layer convergence protocol (PLCP) data unit (PLDU) 200 according to the IEEE 802.11a technical specifications. The data to be transmitted, depending on its overall size, may be broken up into multiple PLDUs, such as the PLDU 200, when transmitted. According to the IEEE 802.11a technical specifications, the PLDU 200 comprises an eight micro-second short sequence field 210 containing repetitions of a short sequence of samples, another eight micro-second long sequence field 220 containing repetitions of a long sequence of samples, a four micro-second signal field 230 containing information regarding the data payload, and a data payload that may be partitioned into multiple data fields (for example, data fields 240 and 250) depending on the amount of data being transmitted.

The short and the long sequences are specified in the IEEE 802.11a technical standards and their names refer to the relative lengths of their periods. The short sequence field 210 contains ten periods of the short sequence, while the long sequence field 220 contains two and a half periods of the long sequence. The purpose of transmitting the short sequence is to allow wireless stations in the wireless network to detect the beginning of the transmission. A secondary purpose of the short sequence is to permit the wireless stations to adjust the gain in their receivers to properly set the signal levels of the received signal for optimal receiver performance.

The long sequence is used by the receiver to train an adaptive channel equalizer. The purpose of the adaptive channel equalizer is to flatten the frequency response of the communications channel, e.g., amplify frequency ranges in the communication channel that are being attenuated and attenuate frequency ranges that are being amplified. The long sequence can also be used to adjust filter characteristics of digital filters present in the receiver. Since the long sequence is used to train the adaptive equalizer, it is preferred to not modify any portion of the long sequence. Modifications to the long sequence, through gain adjustments, would require additional processing when the long sequence is being used to train the adaptive equalizer. Since it is desirable to make gain adjustments throughout the short sequence, the earlier the long sequence is detected, the smaller the portion of the long sequence that may have received gain adjustments and hence requires gain compensation.

Figure 3:
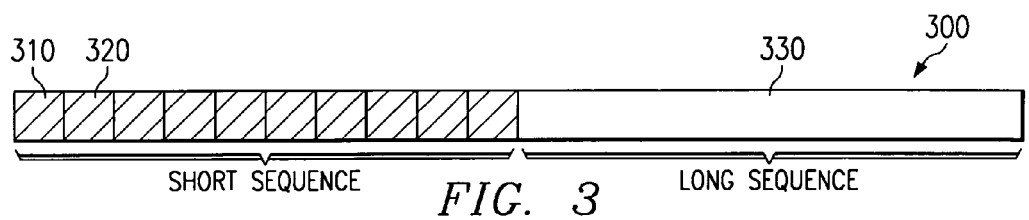
FIG. 3 displays a short sequence field and a long sequence field ready for transmission in greater detail.

Referring now to FIG. 3, a diagram illustrates a sequence 300 containing the short and the long sequence fields, as they are made ready for transmission. As discussed previously, the short sequence field comprises ten periods of the short sequence, examples of which are periods 310 and 320. As discussed previously, the long sequence field contains two and a half periods worth of long sequence. FIG. 3 does not display a breakdown of the long sequence field in its ready to transmit form.

In some modern wireless communications systems, such as Hiperlan, boundaries between sequences are marked. Also, voiceband modem standards, such as V.32, commonly mark the boundaries between training sequences with a special indicator. This is particularly useful when these communication protocols are used in a wireless communication system. For example, a specially reserved sequence of samples may be used to mark the end of one sequence and the beginning of another. Alternatively, a portion at the end of a sequence may be specially marked so that the sequence itself may be used as a signal to the receiver.

Figure 4:
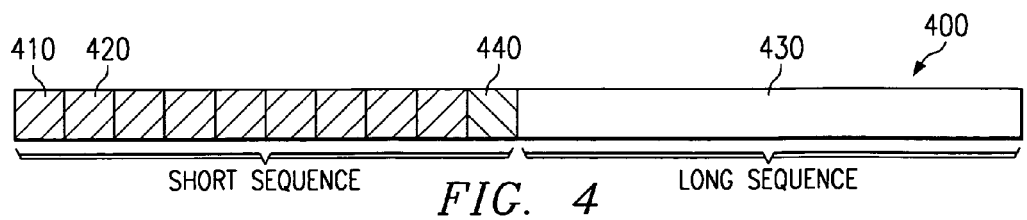
FIG. 4 displays a short sequence field and a long sequence field ready for transmission using a modified signaling format according to a preferred embodiment of the present invention.

Referring now to FIG. 4, a diagram illustrates a sequence 400 containing short and long sequence fields, as they are made ready for transmission according to a preferred embodiment of the present invention. FIG. 4 illustrates a sequence comprising a short sequence field and a long sequence field, similar to FIG. 3. However, the short sequence field in FIG. 4 does not contain ten periods of short sequence. It does contain ten periods, but only nine of the ten periods contain the short sequence. Periods 410 and 420 are examples of the nine periods that contain the short sequence. The long sequence field displayed in FIG. 4 is identical to the long sequence field displayed in FIG. 3, comprised of two and a half periods of the long sequence.

A tenth period 440 of the short sequence field is different from the preceding nine periods of the short sequence field. According to a preferred embodiment of the present invention, the tenth period 440 is used as a marker to indicate the end of the short sequence field and the beginning of the long sequence field. The contents of the tenth period 440 are different from the contents of the remaining nine periods. According to a preferred embodiment of the present invention, the contents of the tenth period 440 are the negated samples of a single period of the short sequence. For example, if a sample in the short sequence is represented by a binary "1", then the corresponding sample in the tenth period 440 would be a binary "0".

According to other preferred embodiments of the present invention, the contents of the tenth period 440 may be a pseudo-random number sequence, an alternating sequence of 1's and 0's, all 1's, all 0's, or any other sequence of samples that are sufficiently different from the short sequence and long sequence that its detection would be relatively simple. Alternatively, rather than binary 1's and 0's, the samples may be positive and negative voltage values.

While a modification such as the one presented in FIG. 4 to the short sequence field will make the communications system non-adherent to the technical standard (IEEE 802.11a), such a modification would permit devices belonging to a single manufacturer or a group of manufacturers who agree on such a modification to provide improved performance of the communications system. For example, when communications devices recognize the presence of a specific modification to the signaling format of a packet, it knows that the source of the packet has enhanced capabilities that the devices may exploit to provide an additional level of performance. It is also possible to use different modifications to signal different enhanced capabilities between communications devices that have previous knowledge of the enhancements.

In an ideal world, a wireless transmission would arrive at the destination in the same form that it was in when transmitted. However, interference, errors, and multi-path combine to distort the transmission. Multi-path is when reflections of the transmission arrives at the destination at different times after being reflected from objects. The distortion to the transmission can result in a received transmission that is very different from when it was transmitted. The use of a marker can help improve the detection of the boundary between the short and long sequence fields.

Indeed, the HiperLan II standard has such a modification for this purpose. A preferred embodiment of the present invention is able to detect the boundary between the short and long sequence of either a HiperLan II packet or an IEEE 802.11a packet without prior knowledge of which type of packet it is receiving. According to a preferred embodiment of the present invention, the differentiation of the two types packets permits the successful decoding of either type of packet. In fact, the detection of the packet type will allow so enabled communications devices to communicate using either type of packet as appropriate.

For example, if a communications device detects a certain packet type being transmitted from another communications device, it can choose to use that certain packet type exclusively when it communicates to that other communications device. In doing so, the communications device may be able to exploit enhanced features of the certain packet type, as discussed above.

Figure 5:
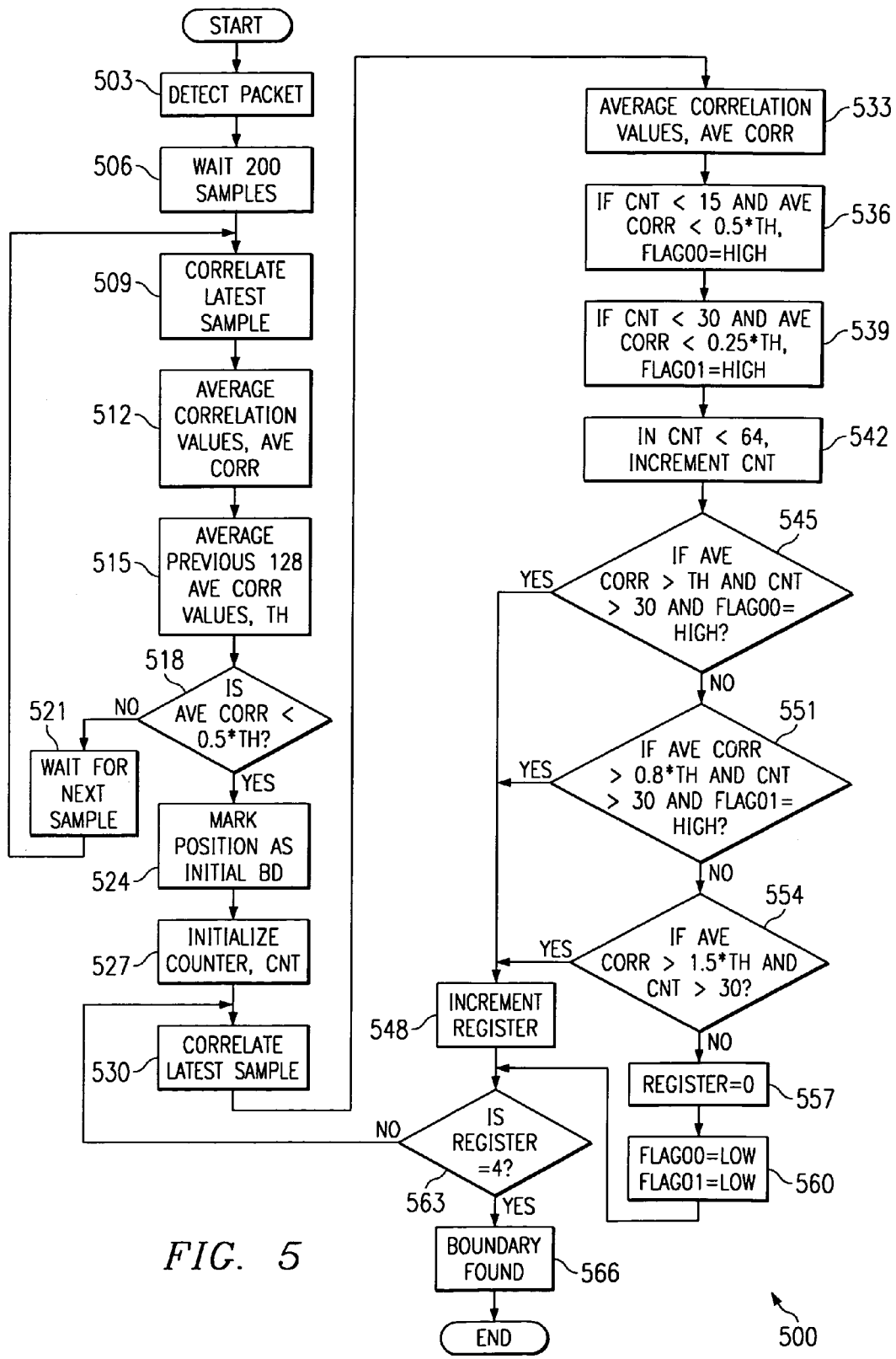
FIG. 5 displays a flow diagram of an algorithm for detecting a boundary between a short sequence field and a long sequence field according to a preferred embodiment of the present invention.

Referring now to FIG. 5, a flow diagram illustrates an algorithm 500 for detecting a boundary between the short and long sequence fields according to a preferred embodiment of the present invention. The algorithm is designed to detect the boundary between the sequences whether the short sequence is compliant to the 802.11a standard or the final period of the short sequence has been inverted. According to a preferred embodiment of the present invention, the algorithm 500 for boundary detection executes on a processor that controls the operations of a radio receiver. The processor may be a general purpose microprocessor, a general purpose digital signal processor, a micro-controller, or a custom designed processor.

The processor begins when the radio receiver detects the presence of a packet on the communications channel (block 503). The detection of the packet may be performed by correlating samples of the communications channel with either a reference sample sequence or by self-correlating the samples with themselves. After the receiver detects the presence of a packet on the communications channel, the receiver waits a period of time while it continues to sample the communications channel and store the samples. According to a preferred embodiment of the present invention, the receiver waits a time period equal to 200 samples (this is equal to 2.5 micro-seconds at the sampling rate of the receiver) (block 506). The purpose of waiting a time period equal to 200 samples is to ensure that a sufficient amount of the packet has been sampled by the receiver to perform some of the later operations in the algorithm 500.

After waiting the requisite amount of time, the receiver correlates a most recent sample with several earlier samples (block 509). According to a preferred embodiment of the present invention, the most recent sample is correlated with samples that are 64, 128, 192, and 256 samples in the past. This type of correlation is known as self-correlation, where the samples are correlated with other samples from the same sequence that were sampled earlier in time. Each correlation of the most recent sample with the four earlier samples results in a correlation value, which is then averaged (block 512).

After averaging the correlated values and producing an average correlation value, average correlation (ave corr), the receiver performs another averaging operation (block 515). The receiver averages a number of previous average correlation (ave corr) values to produce a threshold value, TH. According to a preferred embodiment of the present invention, the receiver averages 128 previous average correlation, starting at 10 average correlation (ave corr) values from the current average correlation value to produce TH. The number of samples that were averaged, 128, was chosen because it provides a sufficient number of average correlation values in the average so that the effects of interference and multi-path are reduced and at the same time, not requiring an overly large number of average correlation values to be averaged. Other numbers of average correlation values may be averaged.

The averaged correlation value, ave corr, is then compared with the threshold, TH (block 518). According to a preferred embodiment of the present invention, if the averaged correlation value is not less than ½ times the threshold, then the receiver waits for the next sample (block 521) and repeats the correlation (509), averaging of the correlation (512), averaging of the previous 128 averages (515), and comparison (518) steps. If the averaged correlation value is less than ½ times the threshold, then the most recent sample is declared an initial boundary detection, BD (block 524).

After the most recent sample has been declared the initial boundary detection (block 524), a counter, cnt, is initialized (block 527). With the counter initialized, the receiver begins a counting and comparison procedure to determine the boundary between the short sequence field and the long sequence field. After the counter has been initialized, the receiver will wait until a new sample is generated. With the generation of the new sample, the receiver once again correlates the new sample with several earlier samples and averages the correlation values (blocks 530 and 533).

The receiver then sets the values in several registers based on the values of average correlation, threshold, and counter. In block 536, if the counter is less than 15 and the average correlation is less than ½ times the threshold, then a flag, FLAG00, is set to high. In block 539, if the counter is less than 30 and the average correlation is less than ¼ times the threshold, then a flag, FLAG01, is set to high. Finally, in block 542, if counter is less than 64, then the counter is incremented. These three comparisons (along with the required correlation and averaging operations) are performed after the generation of each new sample.

After performing the three comparisons, the receiver performs another set of comparisons to determine the boundary between the short and long sequence fields. In block 545, if the average correlation is greater than the threshold and if the counter is greater than 30 and if FLAG00 is high, the receiver will increment a value stored in a register (block 548). In block 551, if the average correlation is greater than 0.8 times the threshold and if the counter is greater than 30 and if FLAG01 is high, then the receiver will increment a value stored in a register (block 548). In block 554, if the average correlation is greater than 1.5 times the threshold and if the counter is greater than 30, then the receiver will increment a value stored in a register (block 548).

If none of the comparisons in blocks 545, 551, and 554 evaluate true, then the register is re-initialized to zero (block 557) and the flags, FLAG00 and FLAG01, are re-initialized to low values.

If any of the comparisons in blocks 545, 551, and 554 evaluate true, then after the receiver increments the value in the register (block 548), the receiver checks to see if the value in the register is greater than or equal to the value four (block 563). If the value in the register is not greater than or equal to four, then the receiver returns to block 530 of the algorithm 500 to correlate the newest generated sample after it is generated. If the value in the register is greater than or equal to the value four, then the boundary between the short and long sequence fields has been found and it is exactly 64 samples ahead of the current sample and the algorithm 500 ends. Not only has the algorithm found the boundary, but the state of the flags indicates whether the sequence that was received contained the special modification or not. Thus, if the modification is also used to signal the presence of enhanced features, the receiver knows whether it can use the enhanced features or not.

Figure 6:
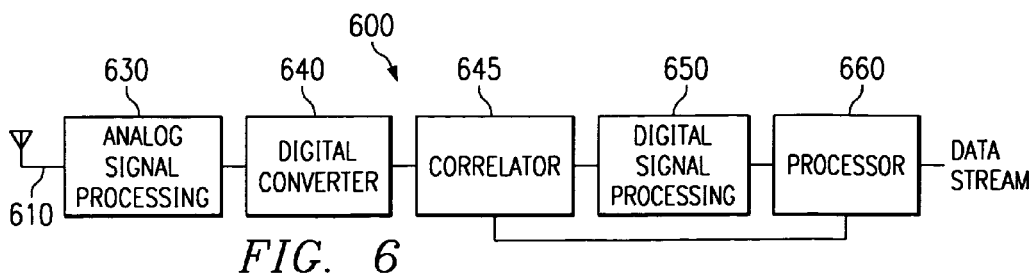
FIG. 6 displays a receive path of a wireless communications device according to a preferred embodiment of the present invention.

Referring now to FIG. 6, a block diagram illustrates a receive path 600 of a receiver in a communications system according to a preferred embodiment of the present invention. In most applications, a receiver is paired with a transmitter into what is commonly referred to as a transceiver. The present invention has application to the receiver portion of a transceiver. Therefore, it is assumed that the transceiver has a transmitter that is fairly typical of transceivers and will not receive any examination.

An antenna 610 receives information transmitted over the communications channel. The sequence of samples receives analog signal processing in an analog signal processing unit 630. The analog signal processing unit 630 performs signal processing tasks such as filtering to allow only signals within a frequency band of interest further passage down the receive path and amplification to bring the signal values of the sequence to a level suitable for processing.

After receiving analog signal processing, the sequence of samples is converted into the digital domain by a digital converter 640. After the digital conversion, the digital sequence of samples is fed into a correlator 645, where the sequence is correlated with itself. The operation of the correlator 645 is as previously discussed. The samples (if it was determined to be a packet) then receive digital signal processing by a digital signal processing unit 650. The digital signal processing unit 650 performs tasks such as digital filtering and adaptive channel equalization. The digital signal processing unit 650 performs tasks that are similar to tasks performed in the analog signal processing unit 630. However, since the tasks are performed by software programs executing on a processor, a greater amount of processing can be performed. A processor 660 is present to perform any decoding and further processing required on the digital sequence of samples. The processor 660 produces a digital data stream, ready for use by a digital device (not shown) coupled to the receiver.

According to another preferred embodiment of the present invention, a communications device with enhanced capabilities will transmit packets using signaling formats as specified in the technical standards. If the device detects a device that is capable of enhanced functionality, perhaps through configuration information provided by the other device or by detecting a special signaling format in a transmission, the device will begin communicating to that other device using a modified signaling format. The use of the modified signaling format will permit the two devices and any other compatible devices to have enhanced functionality not afforded in a single technical standard. Devices that are not enhanced continue to communicate using the specified signaling format. Communications between enhanced devices and unenhanced devices will continue to use the specified signaling format. An enhanced device is capable of receiving data from a standard packet or a modified packet. Additionally, this scheme may be extended to include several different modifications, which can be used to signal different enhancements such as different data rates.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting a boundary between sequences comprising:
    (a) sampling a communications channel;
    (b) detecting a packet on the communications channel using the samples;
    (c) determining an initial boundary position between a first sequence and a second sequence;
    (d) determining a flag status;
    (e) determining a register value;
    (f) comparing the register value with a threshold; and
    (g) determining a final boundary position between the first and second sequences based on the results of the comparison.

2. The method of claim 1, wherein the method further comprises a step of (c.1) initializing a counter.

3. The method of claim 2, wherein the method further comprises a step of (h) repeating steps (d)–(g) until the boundary is found.

4. The method of claim 2, wherein the determining the initial boundary position step comprising:
    correlating a most recent sample with each sample from a plurality of previous samples;
    computing an average correlation from the correlation results;
    computing a threshold from an averaging of a sequence of previously calculated average correlations;
    comparing the average correlation with the threshold; and
    determining the initial boundary based on the results of the comparison.

5. The method of claim 4, wherein the sequence of previously calculated average correlations is a sequence of 128 previously calculated average correlations.

6. The method of claim 5, wherein the sequence of 128 previously calculated average correlations starts 10 average correlations from the most recently calculated average calculation.

7. The method of claim 4, wherein the comparison of average correlation to the threshold compares the average correlation to ½ times the threshold.

8. The method of claim 4, wherein the initial boundary is determined if the average correlation is less than ½ times the threshold.

9. The method of claim 2, wherein the determining the flag status step comprising:
   correlating a most recent sample with each sample from a plurality of previous samples;
   computing an average correlation from an average of the individual correlation results;
   computing a threshold from an average of a set of average correlations;
   firstly comparing the average correlation with the threshold and a value in the counter with a first prespecified value;
   determining the status of a first flag based on the result of the first comparison;
   secondly comparing the average correlation with the threshold and the value in the counter with a second prespecified value;
   determining the status of a second flag based on the result of the second comparison;
   thirdly comparing the value in the counter with a third prespecified value; and
   determining the value in the counter based on the result of the third comparison.

10. The method of claim 9, wherein the first comparison compares the average correlation to ½ times the threshold and the first prespecified value is 15.

11. The method of claim 9, wherein the first flag is set to a high value if the first comparison is true.

12. The method of claim 9, wherein the second comparison compares the average correlation to ¼ times the threshold and the second prespecified value is 30.

13. The method of claim 9, wherein the second flag is set to a high value if the second comparison is true.

14. The method of claim 9, wherein the value in the counter is incremented if the value in the counter is less than the third prespecified value.

15. The method of claim 9, wherein the third prespecified value is 64.

16. The method of claim 2, wherein a most recent sample is correlated with each sample from a plurality of previous samples, an average of the individual correlation results (average correlation) and an average of average correlations (threshold) are computed, wherein the determining the register value step comprising:
   firstly comparing the average correlation with the threshold, the counter with a first value, and a first flag value with a prespecified value;
   secondly comparing the average correlation with the threshold, the counter with the first value, and a second flag value with the prespecified value;
   thirdly comparing the average correlation with the threshold and the counter with the first value;
   incrementing the register value if any of the first, second, and third comparisons are true; and
   setting the register value to zero if all of the first, second, and third comparisons are false.

17. The method of claim 16, wherein the first comparison compares the average correlation to the threshold, the counter with a 30 value, and the first flag value with a high value.

18. The method of claim 16, wherein the second comparison compares the average correlation to 0.8 times the threshold, the counter with a 30 value, and the second flag value with a high value.

19. The method of claim 16, wherein the third comparison compares the average correlation to 1.5 times the threshold and the counter with a 30 value.

20. The method of claim 2, wherein the determining the boundary step comprising the step of declaring the boundary to be a specified number of samples ahead of the most recent sample if the register value is equal to a specified value.

21. The method of claim 20, wherein the specified number is 64.

22. The method of claim 20, wherein the specified value is 4.

* * * * *